United States Patent [19]
Kim

[11] Patent Number: 5,831,398
[45] Date of Patent: Nov. 3, 1998

[54] METHOD AND CIRCUIT FOR ADJUSTING HORIZONTAL VIDEO SIZE USING A MICROCOMPUTER

[75] Inventor: Eun-Sup Kim, Suwon, Rep. of Korea

[73] Assignee: SamSung Electronics Co., Ltd., Kyungki-do, Rep. of Korea

[21] Appl. No.: 770,783

[22] Filed: Dec. 20, 1996

[30] Foreign Application Priority Data

Dec. 20, 1995 [KR] Rep. of Korea .................. 52586/1995

[51] Int. Cl.$^6$ .................................................. H01J 29/56
[52] U.S. Cl. ........................... 315/371; 348/747; 348/581
[58] Field of Search ............................ 315/371; 348/581, 348/747

[56] References Cited

U.S. PATENT DOCUMENTS

| | | |
|---|---|---|
| 4,318,036 | 3/1982 | Bart et al. . |
| 4,385,263 | 5/1983 | Luz et al. . |
| 4,633,146 | 12/1986 | Babcock . |
| 4,926,098 | 5/1990 | Tarrillo . |
| 5,021,719 | 6/1991 | Arai et al. ............................... 315/364 |
| 5,059,874 | 10/1991 | Oliver . |
| 5,113,122 | 5/1992 | Bando et al. ........................... 315/371 |
| 5,504,521 | 4/1996 | Webb et al. ............................. 348/180 |

*Primary Examiner*—Theodore M. Blum
*Attorney, Agent, or Firm*—Robert E. Bushnell, Esq.

[57] ABSTRACT

A horizontal size adjustment circuit and method and for use with a monitor that includes a microcomputer for receiving a horizontal size adjustment signal, a horizontal synchronizing signal and a feedback signal from a horizontal output circuit, and for producing a digital pulse width modulated signal at its output terminal; a current amplifier for amplifying the amplitude of the digital pulse width modulated signal output from the microcomputer so as to drive a switching transformer and a horizontal output circuit for generating a variably controlled horizontal size signal.

12 Claims, 5 Drawing Sheets

METHOD AND CIRCUIT FOR ADJUSTING HORIZONTAL VIDEO SIZE USING A MICROCOMPUTER

CLAIM OF PRIORITY

This application makes reference to, incorporates the same herein, and claims all benefits accruing under 35 U.S.C. 119 from an application for Method and Circuit for Adjusting Horizontal Video Size Using a Microcomputer earlier filed in the Korean Industrial Property Office on Dec. 20 1995 and there duly assigned Ser. No. 52586/1995 by that Office.

FIELD OF THE INVENTION

The present Invention relates to a horizontal size adjustment circuit and method thereof for use in a monitor and more particularly to a horizontal size adjustment circuit for directly adjusting horizontal size by varying an on-time duty cycle of a digital pulse width modulation signal output from a microcomputer, push-pull amplifying a digital pulse width modulation signal to provide an amplified signal to a switching power transformer of a horizontal deflection circuit.

BACKGROUND OF THE INVENTION

Conventional techniques for controlling horizontal picture size in a television of computer monitor contemplate the use of a pulse width modulation circuit. One such technique is discussed in U.S. Pat. No. 4,318,036 to Stan Bart, et.al., entitled Pulse width Modulation For A Television Receiver, wherein a control signal is derived by a first differential amplifier which senses the receiver's high voltage and beam current to produce a control signal which is, in turn, provided to a second differential amplifier, which also receives horizontal rate pulses, for developing pulses whose width is varied in response to variations in the control signal. Another technique is discussed in U.S. Pat. No. 4,926,098 to Albert G. Tarrillo, entitled Push-Pull Class-E Bi-Directional Scanning Circuit wherein an anode voltage of a cathode ray tube is compared to a reference voltage to generate an error voltage. The error voltage is applied to a diode modulator and pulse width modulator operative upon a high voltage transformer to control high voltage in response to changes of beam current loading imposed on the high voltage transformer.

The foregoing U.S. patents are directed towards controlling the horizontal scan width in order to maintain a horizontal image size. A problem exist, however, where a displayed image on some known cathode ray tube monitors do not properly fit on the display screen either horizontally, vertically or both. Therefore, it is desirable to provide control circuits which will enable the user to adjust the size of the displayed signal in the horizontal and/or vertical direction.

SUMMARY OF THE INVENTION

Accordingly, it is an object of the invention to provide an horizontal size adjustment circuit for use with a display apparatus.

Another object is to provide a horizontal size adjustment circuit which directly utilizes a digital pulse width modulation waveform output from a microcomputer.

Still another object is to provide a horizontal size adjustment circuit capable of driving horizontal output circuit with an amplified pulse width modulation waveform signal output from a microcomputer.

2

Still yet another object is to provide a method for adjusting a horizontal size of an image being displayed on a screen of a monitor by directly utilizing a digital pulse width modulation waveform signal output from a microcomputer.

A further object is to provide a simplified circuit design of a horizontal size adjustment circuit so as to enhance a product efficiency in mass production environment, at a low cost.

To achieve these and other objects, there is provided a horizontal size adjustment circuit and for use with a monitor that includes a microcomputer for receiving a horizontal size adjustment signal, a horizontal synchronizing signal and a feedback signal from a horizontal output circuit, and for producing a digital pulse width modulated signal at its output terminal; a current amplifier for amplifying the amplitude of the digital pulse width modulated signal output from the microcomputer so as to drive a switching transformer and a horizontal output circuit for generating a variably controlled horizontal size signal.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE EMBODIMENT

Figure 1:
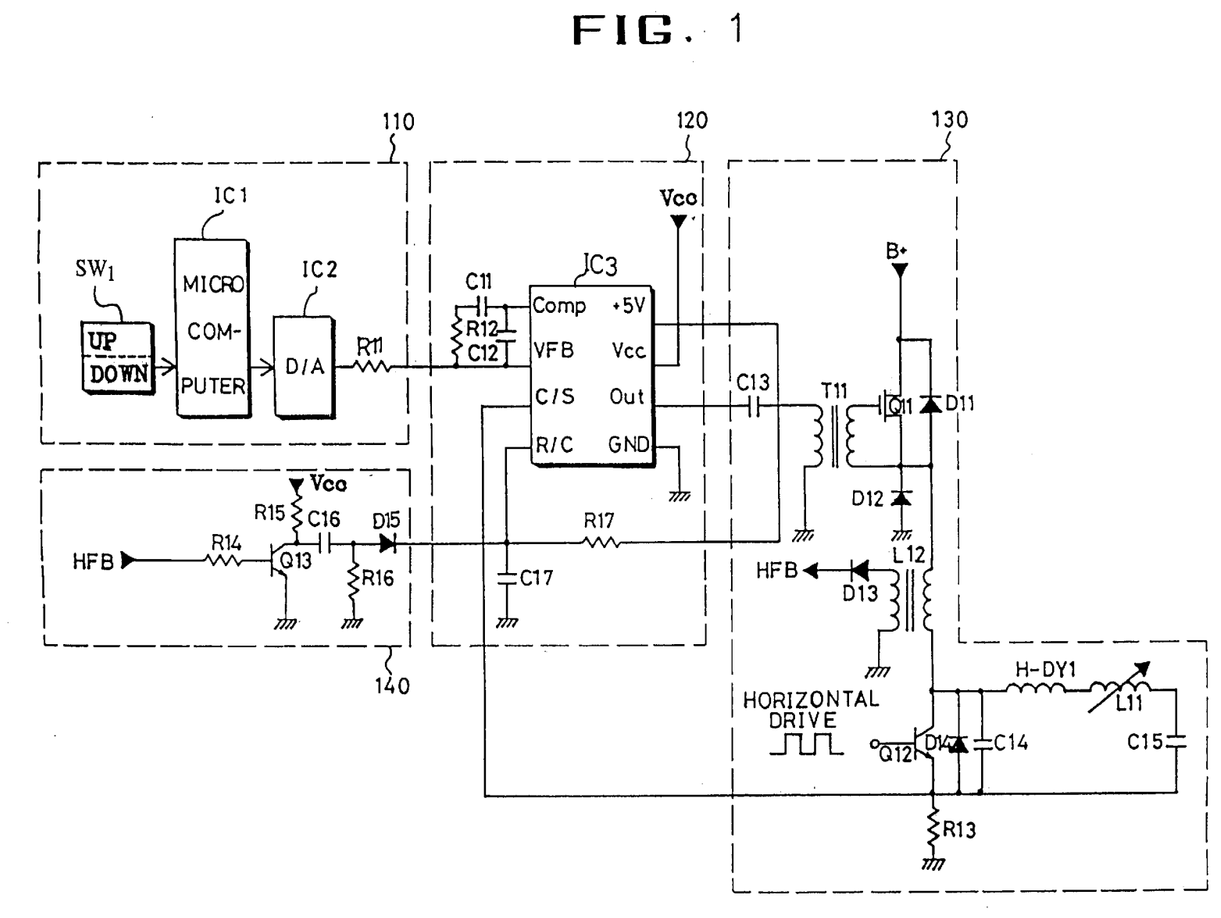
FIG. 1 is a schematic circuit diagram an examplary horizontal size adjustment circuit.

Turning now to FIG. 1, one horizontal size adjustment circuit contemplated utilizes a controller 110, a pulse width modulator 120, a horizontal output circuit 130 and a synchronizing signal trigger circuit 140.

Controller 110 has a horizontal size adjustment switch SW1 for generating an adjustment signal in response to user manipulation, a microcomputer IC1 for generating a digital control signal in response to the adjustment signal input from horizontal size adjustment switch SW1, a digital-to-analog (D/A) converter 1C2 for converting the digital control signal output from microcomputer IC1 into an analog signal, and a bias resistor R11 connected to an output terminal of D/A converter IC2.

Pulse width modulator 120 includes a pulse width modulation integrated circuit IC3 having a comparison input terminal COMP, a voltage feedback input terminal VFB, a current sense input terminal C/S, a RC oscillator input terminal R/C, a +5 volts power supply terminal, a low voltage input terminal Vcc, a ground terminal and an output terminal OUT. A resistor R12 and capacitor C11 are serially connected between resistor R11 and comparison input termianl COMP. Capacitor C12 is connected between the comparison input terminal COMP and voltage feedback terminal VFB . Resistor R11 is also connected to voltage feedback terminal VFB. A capacitor C17 is connected between RC oscillator terminal R/C and a ground terminal. A resistor R17 is connected between RC oscillator terminal R/C and the +5 volts power supply terminal.

Synchronizing signal trigger circuit 140 includes a resistor R14 connected to receive a horizontal flyback signal having a positive voltage waveform, a transistor Q13 for inverting the voltage level of the signal loaded to its base via resistor R14, a collector of transistor Q13 coupled to voltage source Vcc via a resistor R15, a signal differentiation capacitor C16 coupled between the collector of transistor Q13 and an anode of a diode D15, a bias resistor R16 coupled between the anode of diode D15 and a ground terminal, and a cathode of diode D15 connected to RC oscillator terminal R/C of pulse width modulation circuit IC3.

Output terminal OUT of pulse width modulation circuit IC3 is connected via a differentiating capacitor C13 to an input terminal of the primary windings of switching transformer T11 in horizontal output circuit 130. Horizontal output circuit 130 further includes a base electrode of a switching field effect transistor (FET) Q11 is connected to an output terminal of the secondary windings of switching transformer T11, a cathode of a diode D11 is connected to a junction node connecting voltage supply B+ and a drain of FET Q11. An anode of diode D11 is coupled to a junction node connecting a source of FET Q11 and an cathode of a diode D12. The cathode of diode D12 is further connected to an output terminal of the secondary windings, and the anode of diode D12 is connected to a ground terminal. An input terminal of a primary winding of a choke coil L12 is coupled to the junction node of the anode of diode D11 and the cathode of diode D12. A secondary winding of choke coil L12 provides a horizontal flyback signal HFB to resistor R14 of synchronizing signal trigger circuit 140. A transistor Q12 receives a horizontal drive signal comprised of a plurality of pulses at its base. An emitter of transistor Q12 is connected to a junction node of a load resistor R13 and current sense terminal C/S of pulse width modulation circuit IC3, wherein load resistor R13 is further connected to a ground terminal. A collector of transistor Q12 is connected to an output terminal of the primary windings of choke coil L12, and is also coupled to a junction node connecting a cathode of damping diode D14, a retrace capacitor C14 and a horizontal deflection coil H-DY1. A horizontal linearity adjustment coil L11 and S-correction capacitor C15 are connected in series between an output terminal of horizontal deflection coil H-DY1 and the junction node connecting the emitter of transistor Q12, load resistor R13, the anode of dampening diode D14 and retrace capacitor C14. The operation of the horizontal display size adjustment circuit of FIG. 1 will be explained in more detail below.

Upon operation of horizontal size adjustment switch SW1 by user manipulation, an adjustment signal is fed to an input terminal of microcomputer IC1. Then a digital signal is generated at an output terminal of microcomputer IC1 and provided to an input terminal of D/A converter IC2 in response to the input adjustment signal, and the digital signal is then converted to an analog signal of a constant DC voltage level. The analog signal is applied via resistor R11 to voltage feedback terminal VFB of pulse width modulation circuit IC3 and to comparitor terminal COMP of pulse width modulation circuit IC3 via resistor R12 and capacitor C11. As a result, pulse width modulation circuit IC3 outputs, at its output terminal OUT, a square wave signal having a variable on-time duty cycle in dependence upon the voltage level of the analog signal output from controller 110. The square wave signal is applied to an input terminal of the S primary windings of transformer T11 via differentiating capacitor C13 and a voltage induced across the secondary windings of transformer T11 is applied to the base electrode of switching FET Q11 thereby establishing an electrically conducting channel between source and drain electrodes by an ON/OFF switching operation of switching FET Q11, and choke coil L12 is energized or deenergized accordingly. A maximum peak current I value at choke coil L12 is obtained with following equation.

$$I_{PK} = \frac{B^+ \times T_{ON}}{L_{12}}$$

Here, $B^+$ denotes a potential level of a voltage source being applied to the drain of switching FET Q11; $T_{ON}$ denotes a value of on-time duration of the square wave output from the switching FET Q11; and $L_{12}$ is the inductance value of choke coil L12.

Upon applying the above explained equation to an operation of the examplary constructed horizontal size adjustment circuit discussed above, for the sake of explanation purpose, a down key on horizontal size adjustment switch is pushed down by user manipulation so as to reduce horizontal size of an image currently being displayed on a visual screen of a monitor. An adjustment signal output from horizontal size adjustment switch is applied to microcomputer IC1. Microcomputer IC1 provides a digital signal to D/A converter IC2. D/A converter IC2 converts the digital signal input to an analog signal, and supplies the analog signal to a voltage feedback terminal VFB of pulse width modulation circuit IC3. As a result, a duty factor of a signal output from output terminal OUT is decreased so that the switching on-time of switching FET Q11 is shortened in proportion thereto. Thus the value of maximum peak current $I_{PK}$ flowing across choke coil L12 is decreased, according to the above described equation, thereby reducing a horizontal display size of an image.

On the contrary, an up key is pushed down by a user's desire to enlarge the horizontal size of an image being displayed on a screen monitor. Upon applied of an adjustment signal from horizontal size adjustment switch SW1 in response to manipulation of the up key, microcomputer IC1 outputs a digital signal to D/A converter IC2 so as to increase the voltage level of a generated analog signal. The analog signal having an increased voltage level enables pulse width modulation circuit IC3 to output a signal having an enlarged duty factor. Accordingly, an on-time of switching FET Q11 is increased allowing choke coil L12 to maximize current flow thereby enlarging the horizontal display size of an image.

It has been determined that the examplary horizontal size circuit as described dictates that overall constructional design for the circuit requires a variety of electrical and electronic components thereby complicating the circuit and causing undesirable noise problems which affects inversely influence the resulting product such as causing product efficiency to drop in a mass manufacturing environment, increasing inferior production, and affecting overall cost thereby pushing up an unit price of a display apparatus.

Figure 2:
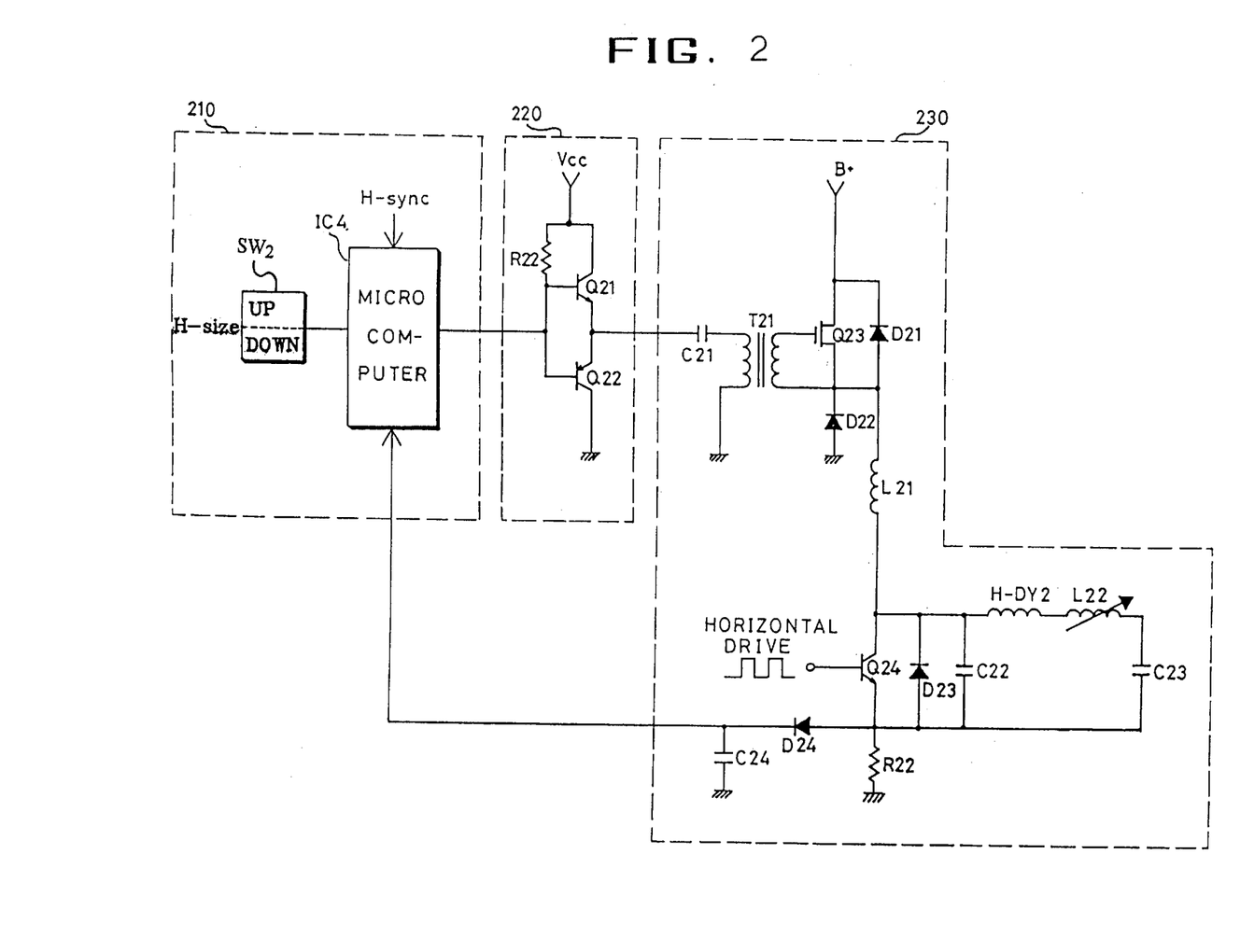
FIG. 2 is a schematic circuit diagram of a horizontal size adjustment circuit according to the principles of the present invention.

Turning now to the preferred embodiment of the present invention as shown in FIG. 2, a horizontal size adjusting circuit comprises a horizontal signal controller 210, a current amplifier 220 for amplifying the amplitude of output current from horizontal signal controller 210 and a horizontal output circuit 230 connected to an output terminal of current amplifier 220.

Horizontal signal controller 210 comprises a horizontal size adjustment switch SW2 and a microcomputer IC4 disposed to receive a horizontal size adjustment signal output from horizontal size adjustment switch SW2, a horizontal synchronizing signal H-sync provided by, for example, a computer system, and a feedback signal from horizontal output circuit 230. Microcomputer IC4 outputs a pulse width modulated signal in response to the horizontal size adjustment signal, the horizontal synchronizing signal H-sync, and the feedback signal.

Current amplifier 220 is comprised of a push-pull amplifier comprising a resistor R22 and a pair of transistor Q1 and Q2. The bases of transistors Q21 and Q22 are commonly connected to receive the pulse width modulated signal. Resistor R22 is connected between the base and collector of transistor Q21, and a voltage Vcc is supplied to the collector of transistor Q21. A collector of transistor Q22 is connected to a ground terminal. The emitters of transistors Q21 and Q22 are commonly coupled to an input terminal of horizontal output circuit 230.

Horizontal output circuit 230 comprises an input terminal connected to a differentiating capacitor C21, which is, in turn, connected to an input of a primary winding of transformer T21. A base electrode of a switching field effect transistor (FET) Q23 is connected to an output terminal of the secondary windings of transformer T21, a cathode of a diode D21 is connected to a junction node connecting voltage supply B+ and a drain of FET Q23. An anode of diode D21 is coupled to a junction node connecting a source of FET Q23 and a cathode of a diode D22. The cathode of diode D22 is further connected to an output terminal of the secondary windings, and the anode of diode D22 is connected to a ground terminal. An input terminal of a choke coil L21 is coupled to the junction node of the anode of diode D21 and the cathode of diode D22. A transistor Q24 receives a horizontal drive signal comprised of a plurality of pulses at its base. A collector of transistor Q24 is connected to an output terminal of choke coil L12, and is also coupled to a junction node connecting a cathode of damping diode D23, a retrace capacitor C22 and a horizontal deflection coil H-DY2. A horizontal linearity adjustment coil L22 and S-correction capacitor C23 are connected in series between an output terminal of horizontal deflection coil H-DY2 and a junction node connecting the emitter of transistor Q24, a load resistor R22, the anode of dampening diode D23, retrace capacitor C22 and an anode of a rectifying diode D24. A smoothing capacitor is connected between the cathode of diode D24 and a ground terminal, and the cathode of diode D24 provides the feedback signal to microcomputer IC4 of horizontal signal controller 210. The operation of the horizontal display size adjustment circuit of FIG. 2 will be explained in more detail below.

Microcomputer IC4 in horizontal signal controller 210 receives a horizontal synchronizing signal H-sync, an adjustment signal output from horizontal size switch SW2 up/down keys and the feedback signal applied from an output terminal of horizontal output circuit 230, processes the received signals and outputs a pulse width modulated signal. This pulse width modulated signal is a digital signal, which, being triggered by the horizontal synchronizing signal H-sync, is synchronized with at same frequency as the horizontal synchronizing signal H-sync. The on-time duty cycle of the pulse width modulated signal output varies in dependence upon the up/down keys horizontal size adjustment switch SW2. The feedback signal compensates for a phase difference between the output of the horizontal output circuit 230 and the received horizontal synchronizing signal H-sync.

Figure 3:
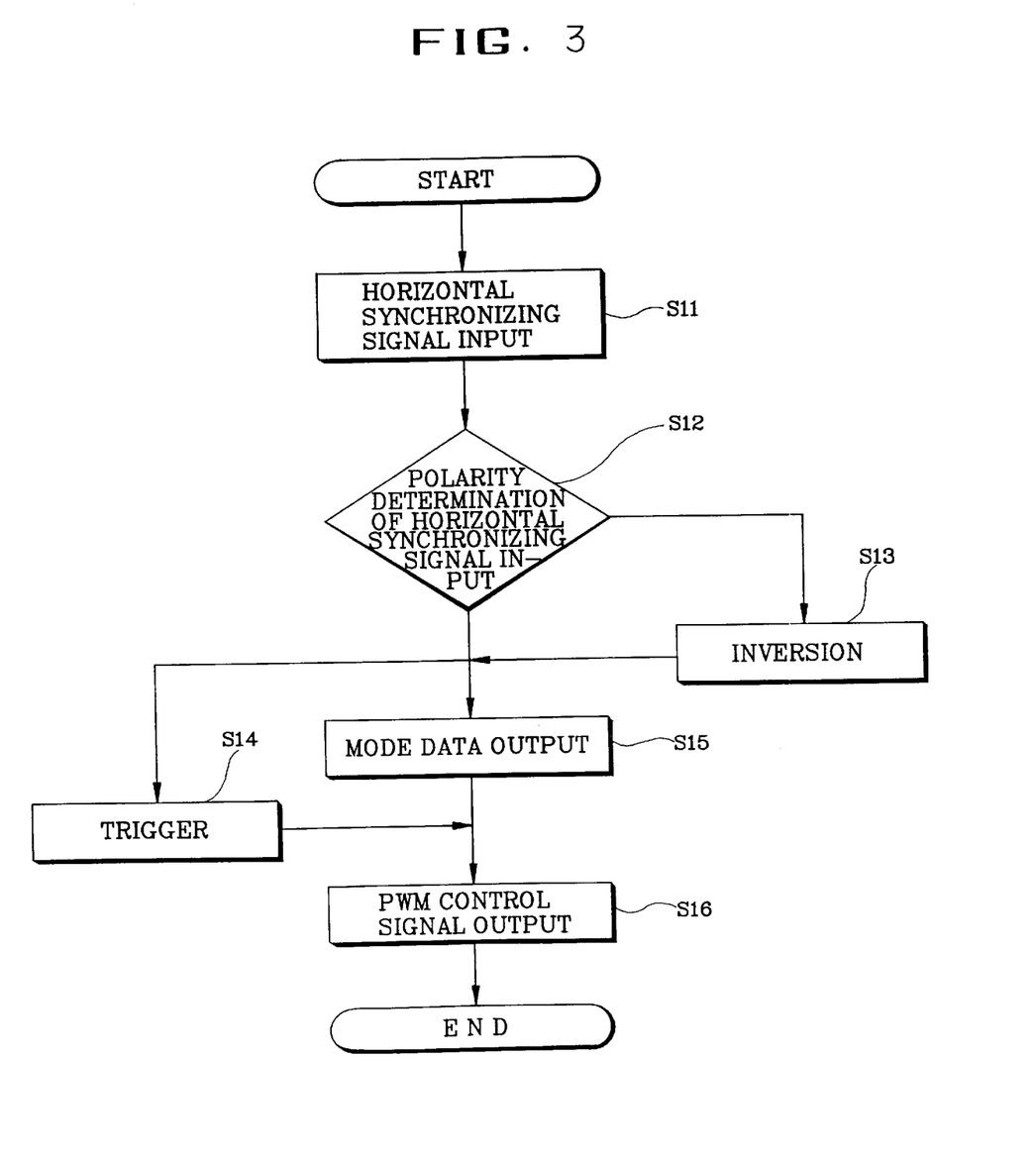
FIG. 3 is a flow chart illustrating a sequence of an operations of a microcomputer utilized in the horizontal size adjustment circuit according to the principles of the present invention.
Figure 4:
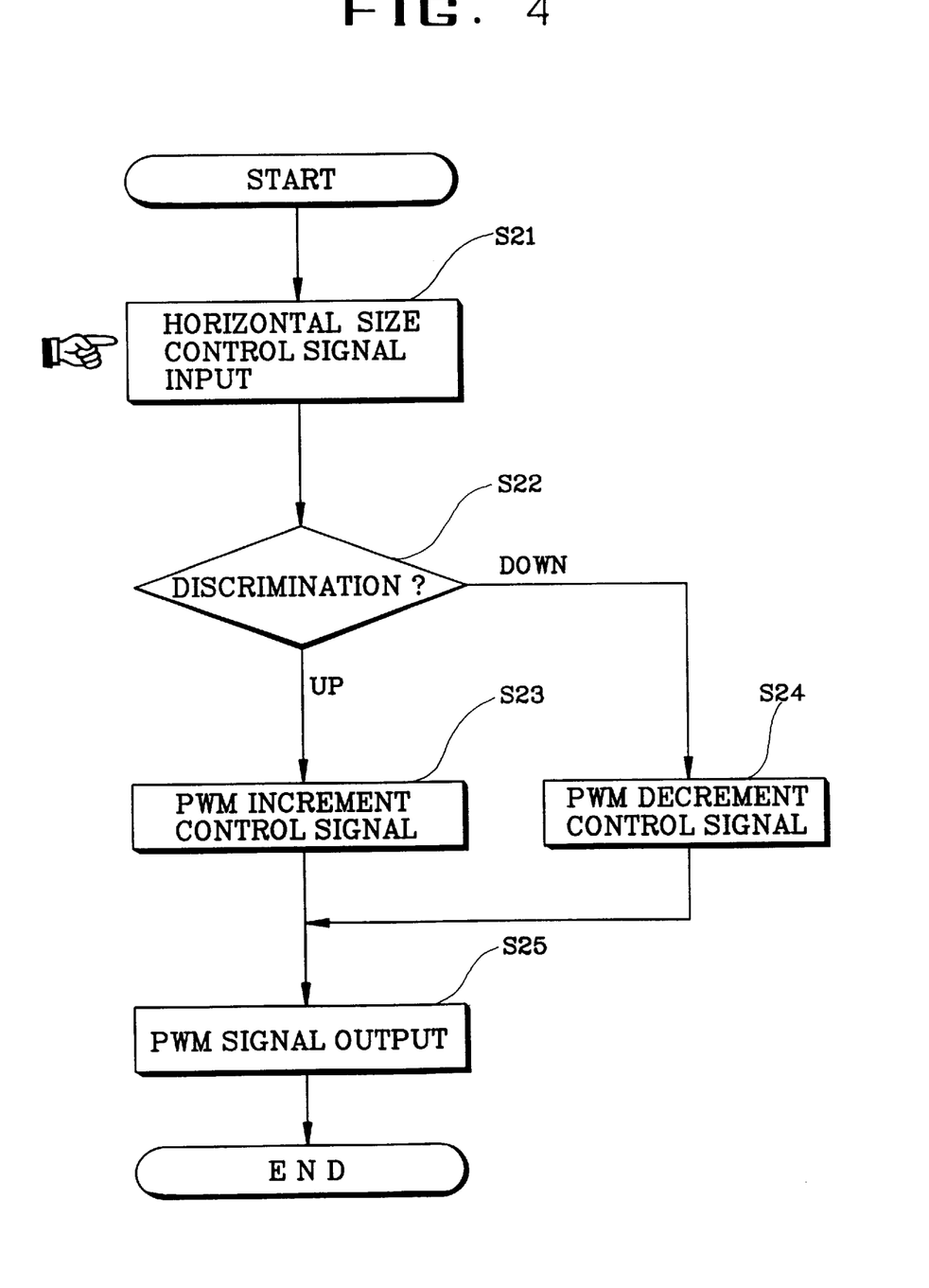
FIG. 4 is another flow chart Illustrating a sequence of an operation of a microcomputer utilized in the horizontal size adjustment circuit according to the principles of the present invention.

Circuit operations of a microcomputer IC4 will be further explained in detail in conjunction with the flow charts of FIGS. 3 and 4. A flow chart which sequentially illustrates processing operations of microcomputer IC4 upon receipt of horizontal synchronizing signal H-sync is shown in FIG. 3. When horizontal synchronizing signal H-sync is input at an input terminal of microcomputer IC4, step S11, the polarity of the H-sync signal is determined in step S12. When it is determined that the polarity is negative, the H-sync signal is inverted to become positive, step S13. A positive polarity H-sync signal triggers the microcomputer to synchronize at a constant frequency level, step S14 of the H-sync signal. At this moment, mode data, corresponding to a positive horizontal synchronizing signal H-sync, stored in a memory of microcomputer IC4 is read out by a central processing unit, step S15. A pulse width modulated signal is then generated at an output terminal, step S16, of microcomputer IC4.

As illustrated in FIG. 4, a horizontal size adjustment signal input from horizontal size adjustment switch SW2 is received at the corresponding input terminal of microcomputer IC4 in step S21. A determination is made as to whether the adjustment signal is indicative of user manipulation of the up key UP or the down key DOWN in step S22. Based on a discrimination of the UP key, a pulse width modulation increment control signal is generated, in step S23. Otherwise, based on a discrimination of down key DOWN, a pulse width modulation decrement control signal is generated in step S24.

A pulse width modulated signal output from microcomputer IC4 has relatively small current amplitude and is insufficient for driving transformer T21 of horizontal output circuit 230. Thus the pulse width modulated signal is amplified by the push-pull amplifier in current amplifier 220 to sufficiently drive transformer T21.

Figure 5A:
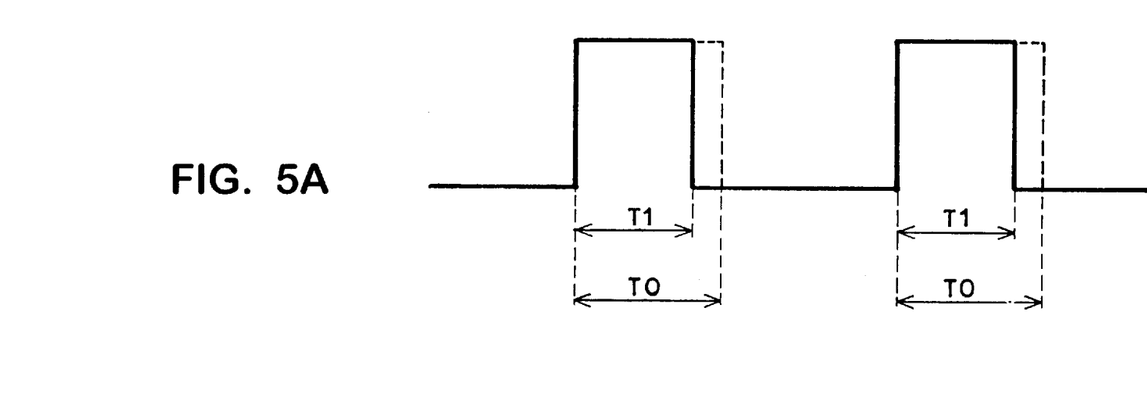
FIGS. 5A and 5B illustrate a variation in on-time of a switching field effect transistor in response to the variation of a pulse width modulated signal according to the principles of the present invention.

An amplified pulse width modulated signal output from push-pull amplifier is differentiated by capacitor C21 and in turn applied to an input terminal of the primary windings of transformer T21. A voltage induced across the secondary windings of transformer T21 drives switching FET Q23. A signal output from a switching FET Q23 energize choke coil L21. At this time the maximum peak current $I_{PK}$ flowing across choke coil T21 can be calculated by using above mentioned equation. As a result, the duty cycle of the pulse width modulated signal output from microcomputer IC4 is decreased so as to reduce a horizontal display size in response to manipulation of the down key DOWN of horizontal size adjustment switch SW2 thereby resulting in a decrease in the on-time duration of switching FET Q23. Consequently, the on-time duration is reduced from a time interval of T0 to T1 as illustrated in FIG. 5A. This causes the maximum peak current $I_{PK}$ flowing across choke coil L21 to decrease, thereby allowing a horizontal video size of a displayed image to reduced.

Figure 5B:
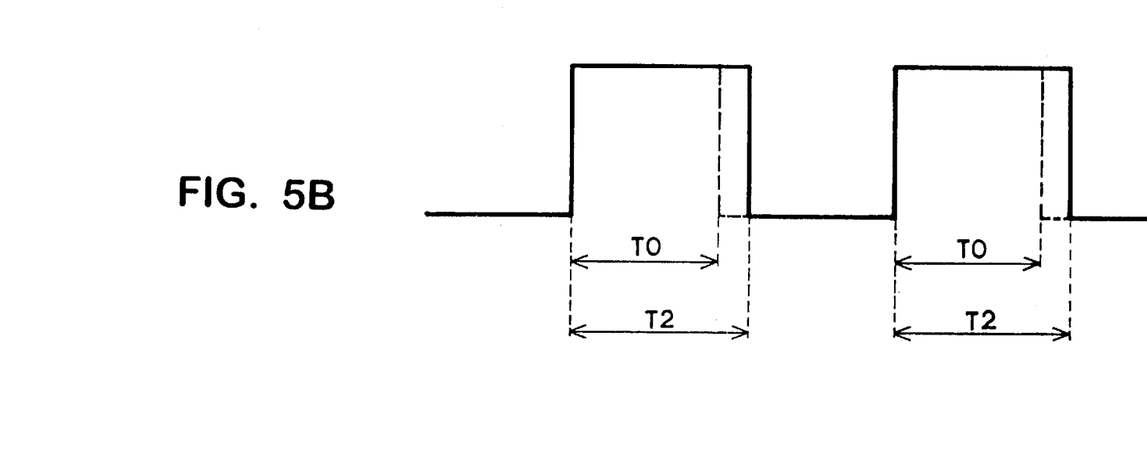

On the contrary, when a user desires to enlarge a horizontal video size of a displayed image, the up key UP is manipulated and the on-time duty cycle of the pulse width modulated signal output from microcomputer IC4 is increased so as to increase the on-time of switching FET Q23 from T0 to T2 as illustrated in FIG. 5B. This causes the maximum peak current $I_{PK}$ flowing across choke coil L21 to increase, thereby allowing a horizontal video size of a displayed image to be increased.

As explained above, the present invention enables a horizontal size adjustment circuit as constructed according to the preferred embodiments to adjust a horizontal display size by simply varying the on-time duration ratio of a duty factor of a pulse width modulated signal output from a microcomputer which is fed with an instruction by user manipulation of a horizontal size adjustment switch.

While there have been illustrated and described what are considered to be embodiments of the present invention, it will be understood by those skilled in the art that various changes and modifications may be made, and equivalents may be substituted for elements thereof without departing from the true scope of the present invention. In addition, many modifications may be made to adopt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments failing within the scope of the appended claims.

What is claimed is:

1. A circuit for adjusting a horizontal size of an image displayed on a screen of a display apparatus, said circuit comprising:
    a horizontal size adjustment switch responsive to user manipulation for generating an adjustment signal for controlling the horizontal size of said image;
    a microcomputer for generating a digital pulse width modulated signal in response to reception of a horizontal synchronizing signal, said adjustment signal and a feedback signal from a horizontal deflection yoke;
    current amplifying means for generating an amplified signal by amplifying a current amplitude of said digital pulse width modulated signal; and
    a horizontal output circuit comprising a switching transformer responsive to said amplified signal, said horizontal output circuit controlling a horizontal deflection yoke in response to said amplified signal and a horizontal drive signal; and
    said horizontal output circuit providing said feedback signal to said microcomputer.

2. The circuit as set forth in claim 1, further comprising said microcomputer being synchronously triggered by said horizontal synchronizing signal, said horizontal synchronizing signal having a constant frequency level.

3. The circuit as set forth in claim 1, further comprising an on-time duration of a duty cycle of said digital pulse width modulated being controlled in response to said adjustment signal.

4. The circuit as set forth in claim 1, further comprising a waveform of said digital pulse width modulated signal being phase compensated by said feedback signal.

5. The circuit as set forth in claim 1, said current amplifying means comprising a push-pull amplifier circuit.

6. The circuit as set forth in claim 5, said push-pull amplifier circuit comprising a first and second transistors each having a base coupled to an output terminal of said microcomputer for receiving said digital pulse width modulated signal, an emitter of each of said first and second transistors commonly coupled to provide said amplified signal to said switching transformer.

7. The circuit as set forth in claim 1, said horizontal output circuit further comprising a capacitor for providing a differentiated amplified signal to a primary coil of switching transformer by differentiating said amplified signal generated by said current amplifying means.

8. The circuit as set forth in claim 1, said horizontal output circuit further comprising:
    a field effect transistor having a gate connected to an induced voltage provided by a secondary coil of said switching transformer in response to said amplified signal, an on-time of said field effect transistor being controlled in response to said induced voltage;
    a drain of said field effect transistor being connected to a high voltage source;
    a horizontal drive transistor having a base for receiving horizontal drive signal;
    a chopper coil connected between a source of said field effect transistor and a collector of said horizontal drive transistor;
    a first diode having an anode and cathode respectively connected to said source and said drain of said field effect transistor;
    a second diode having an anode and a cathode respectively couple to said source of said field effect transistor and a ground terminal;
    a third diode having a cathode and anode respectively connected said collector and an emitter of said horizontal drive transistor;
    a retrace capacitor connected in parallel with said third diode;
    a horizontal deflection yoke, a horizontal linearity control coil and a S-correction capacitor serially connected between said collector and said emitter of said horizontal drive transistor;
    a resistor connected between said emitter of said horizontal drive transistor and said ground terminal;
    a forth diode having an anode connected to said emitter of said horizontal drive transistor; and
    a smoothing capacitor connected between a cathode of said forth diode and said ground terminal, said cathode of said forth diode providing said feedback signal to said microcomputer.

9. A method of adjusting a horizontal size of an image being displayed on a screen of a monitor in a computer system, said method comprising the steps of;
    applying a horizontal synchronizing signal generated from said computer system to a microcomputer;
    determining polarity of said horizontal synchronizing signal;
    inverting said horizontal synchronizing signal when it is determined that said horizontal synchronizing signal has a negative polarity;
    triggering said microcomputer in response to a horizontal synchronizing signal of positive polarity to synchronize said microcomputer at a constant frequency level of said horizontal synchronizing signal;
    reading out mode data corresponding to the positive polarity horizontal synchronizing signal from a memory of said microcomputer; and
    generating, in response to said mode data, a pulse width modulated signal having an on-time duty factor, said pulse width modulated signal being output from said microcomputer for controlling the horizontal size of said image being displayed on said screen of said monitor in said computer system.

10. The method as set forth in claim 9, further comprising the steps of:
- amplifying said pulse width modulated signal utilizing a push-pull amplifier to generate an amplified signal; and
- controlling a horizontal output circuit in response to said amplified signal.

11. The method as set forth in claim 9, further comprising the steps of:
- generating a horizontal size adjustment signal in response to user manipulation of an adjustment switch;
- providing said horizontal size adjustment signal to said microcomputer for controlling the on-time duty factor of said pulse width modulated signal.

12. The method as set forth in claim 11, further comprising the steps of:
- determing whether said horizontal size adjustment signal is indicative of user manipulation of a down key or an up key of said adjustment switch;
- increasing the on-time duty factor of said pulse width modulated signal when it is determined that said horizontal size adjustment signal is indicative of user manipulation of said up key, said horizontal size of said image being enlarged when said on-time duty factor of said pulse width modulated signal is increased; and
- decreasing the on-time duty factor of said pulse width modulated signal when it is determined that said horizontal size adjustment signal is indicative of user manipulation of a down key, said horizontal size of said image being reduced when said on-time duty factor of said pulse width modulated signal is decreased.

* * * * *